March 28, 1961 C. L. CARLSON ET AL 2,977,262

SEMICONDUCTOR DEVICES INCLUDING GALLIUM-CONTAINING ELECTRODES

Filed May 19, 1955

INVENTORS
CARL L. CARLSON
HERBERT NELSON
BY J. C. Whittaker
ATTORNEY

United States Patent Office 2,977,262
Patented Mar. 28, 1961

2,977,262

SEMICONDUCTOR DEVICES INCLUDING GALLIUM-CONTAINING ELECTRODES

Carl L. Carlson and Herbert Nelson, New Providence, N.J.; said Carlson assignor to Radio Corporation of America, a corporation of Delaware Filed May 19, 1955, Ser. No. 509,444
9 Claims. (Cl. 148—33)

This invention relates to improved semiconductor devices and methods of making them. More particularly it relates to improved alloy compositions for use in surface alloyed electrodes to make improved surface alloyed type semiconductor devices.

Surface alloyed type semiconductor devices such as diode rectifiers and triode transistors may be made by surface alloying a selected electrode material upon one or more faces of a semiconductive body such as a germanium or silicon wafer. The electrode material generally comprises a significant impurity capable of imparting a predetermined type of conductivity to the semiconductive body when dispersed therein. Usually in the case of rectifiers and transistors the significant impurity of the electrode imparts conductivity of the opposite type from the type initially present in the semiconductive body. For example, a rectifying electrode may be formed upon a surface of an n-type semiconductive germanium or silicon wafer by surface alloying an indium electrode thereon, indium being a material capable of imparting p-type conductivity to semiconductive germanium or silicon when dispersed therein.

Indium is a commonly used electrode material for making surface alloyed rectifying electrodes upon n-type semiconductive germanium and silicon bodies. Indium is soft, relatively easy to handle, wets germanium fairly readily and is capable of dissolving substantial proportions of germanium at temperatures well below the melting point of germanium. Rectifying electrodes formed of indium also exhibit relatively favorable electrical properties. Such electrodes, however, are limited in their performance at relatively high current densities in the forward direction. Transistor devices utilizing such electrodes as emitters, for example, exhibit inferior electrical characteristics when they are operated at relatively high currents.

According to the instant invention it has been found that electrodes comprising alloys of gallium surface alloyed to semiconductive germanium or silicon exhibit greatly improved electrical characteristics as compared with previous electrodes. Not only are the high current density characteristics improved, but also the characteristics at relatively low current densities. It has also been found that the inclusion of gold or silver in the alloys further enhances their chemical and physical stability and permits the inclusion of relatively large proportions of gallium. The gold or silver also increases the penetration of the electrodes into the semiconductor surface and permits use of relatively thick wafers in transistor construction.

The preferred electrode compositions according to the invention comprise alloys of indium with .05% to less than 1% gallium and up to 10% gold or silver by weight.

Figure 1:
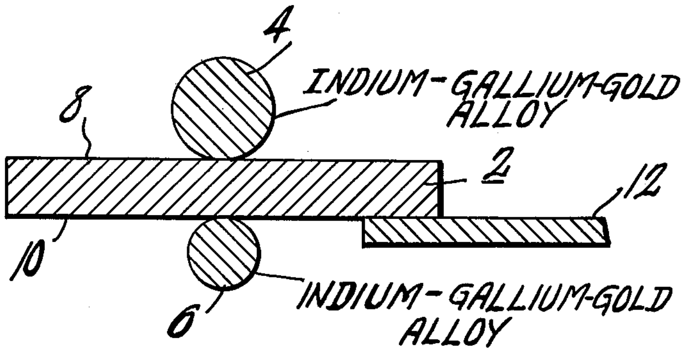
Figure 2:
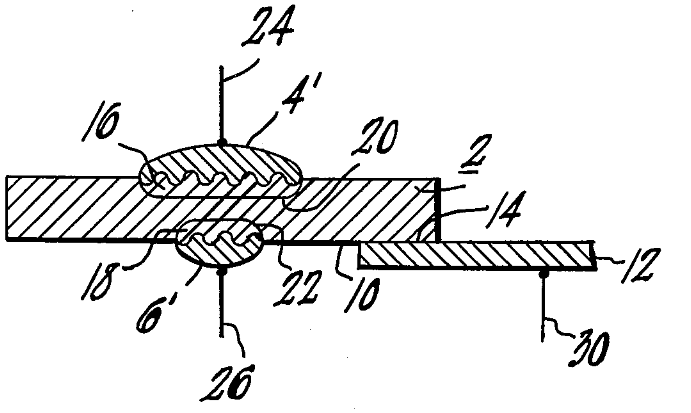

The invention will be explained in greater detail in connection with the accompanying drawing of which:

Figure 1 is a schematic, cross-sectional, elevational view of the constituent parts of a transistor device assembly preparatory to a surface alloying process; and Figure 2 is a schematic, cross-sectional, elevational view of a completed transistor device according to the invention.

Similar reference characters are applied to similar elements throughout the drawing.

A triode transistor device may be made according to a preferred embodiment of the invention by surface alloying electrode pellets 4 and 6 upon opposite faces of an n-type semiconductive germanium base wafer 2 as shown in Figure 1. The germanium wafer may be about 0.1" x .085" x .01" thick when initially cut from a relatively large single crystal ingot of n-type semiconductive germanium. The opposite faces 8 and 10 of the wafer are ground to a smooth finish. The wafer is then etched in a mixture of hydrofluoric and nitric acids to reduce its thickness to about .005" and to expose a clean, crystallographically undisturbed surface. An electrode pellet 4 consisting of about 97.8% indium, 0.2% gallium, and 2% silver by weight is placed upon one surface 8 of the wafer. The electrode pellet may be in the shape of a sphere about .025" in diameter or, alternatively, a disc about .045" diameter x .005" thick. The wafer and pellet are heated at about 550° C. in a dry hydrogen atmosphere for about six minutes to fuse the pellet to the surface of the wafer.

The wafer is then inverted and a second pellet 6, similar in composition to the first pellet, is placed upon the opposite surface 10 of the wafer in coaxial alignment with the first pellet 4. The second pellet 6 is preferably about one-third the size of the first pellet and may be, for example, a sphere about .025" in diameter or a flat disc about .015" in diameter and .005" thick. A solder coated base tab 12, which may be of nickel, is placed in contact with the wafer upon the surface 10 adjacent to the second, or smaller electrode 6.

The solder coating of the base tab preferably includes an n-type significant impurity and may for example consist of 49% tin, 49% lead and 2% antimony by weight. Such a solder is capable of making a non-rectifying connection between the n-type wafer 2 and the nickel tab 12.

The entire ensemble is then heated at about 550° C. for about four minutes in a dry hydrogen atmosphere to surface alloy the second electrode upon the wafer and simultaneously to solder the base tab upon the wafer. The device is then preferably cooled slowly at a maximum average rate of about 20° C. per minute to a temperature of about 300° C. From 300° C. down to room temperature the rate of cooling is not critical and may be as rapid as desired.

A device thus formed is shown in Figure 2 and comprises the base wafer 2 of n-type semiconductive germanium with rectifying electrodes 4' and 6' surface alloyed upon opposite faces thereof. A base tab 12 is connected by a non-rectifying solder connection 14 to one surface 10 of the wafer.

During the alloy process the molten electrodes dissolve substantial proportions of the germanium wafer. Upon cooling, most of the dissolved germanium recrystallizes upon the wafer to form the recrystallized regions 16 and 18 which may conveniently be considered parts of the respective electrodes. The recrystallized regions include significant quantities of the conductivity type-determining impurities of the electrodes, principally indium and gallium. The surfaces of furthest penetration of the molten electrodes during the alloy process are called the alloy fronts and are shown as lines 20 and 22 in the figure. P-n rectifying junctions (not separately shown) are formed closely adjacent to the alloy fronts, probably about 10 to 100 Angstroms deeper in the wafer than the alloy fronts.

The device may be conventionally etched by immersing it for a few seconds in a solution such as 2% nitric acid in methanol, or by electrolyzing it in an aqueous 50% potassium hydroxide solution. It is then rinsed in distilled water. Electrical leads 24, 26 and 30 are attached to the electrodes and to the base tab, respectively, and the device may be conventionally mounted and potted.

Transistor devices according to the invention exhibit unexpectedly improved current gain characteristics, particularly when compared to previous devices utilizing ordinary indium electrodes. The effect is especially noticeable at relatively high current densities where the current gain factor has been found to be as much as ten times greater than the current gain factors of previous devices.

Additionally, by utilizing electrode materials according to the invention it is now possible to make improved transistor devices having base wafers of n-type semiconductive germanium of relatively low resistivity. When utilizing indium as an electrode material it is often necessary to use base wafers of between 2 and 5 ohm-cm. resistivity to make a commercially acceptable device. With electrode materials according to the invention, on the other hand, satisfactory rectification characteristics and transistor operation may be obtained with germanium base wafers of as low as 0.1 ohm-cm. resistivity. The reduction in base material resistivity made possible by electrode materials of the invention permits a further improvement in the electrical characteristics of transistor devices by providing improved performance at relatively high electrical frequencies.

Electrodes according to the invention may comprise indium and gallium alone, in which case the proportion of gallium in the electrode alloy is preferably limited to less than 0.2%. If the proportion of gallium in such an alloy is increased substantially beyond 0.2%, the alloy is less stable and the gallium tends to precipitate or to separate from the indium to form a separate phase.

Preferably, the electrodes of the invention include silver or gold in proportions of up to about 10% by weight in addition to gallium and indium. Silver and gold act as carriers to dissolve gallium in indium so that stable indium-base alloys may be prepared including up to about 1% gallium by weight. Silver and gold increase the stability of the alloys and facilitate their preparation. These metals also improve the wetting action of the alloys upon germanium and silicon and thus facilitate the surface alloying process. The proportion of gold or silver in the alloys is not critical. Variations in the proportion appear principally to affect the depth of penetration of the electrodes during the alloy process.

A proportion of about 2% gold or silver provides maximum penetration in the specific process heretofore described. Two percent is, therefore, the preferred proportion for use in transistors made by that process because it permits the use of relatively thick semiconductor wafers without increasing the spacing between the oppositely disposed junctions.

The preferred compositions of the invention comprise indium alloyed with .05% to less than 1% gallium and up to 10% gold or silver by weight based upon the total weight of the alloy. Optimum results have been obtained with such alloys in which the gallium proportion is 0.1% to 0.5% by weight.

The upper limit of the gallium proportion in the alloys is primarily determined by the physical properties of the alloys. If 1 wt. percent or more of gallium is included, the alloys become relatively brittle and fragile and are difficult to form into pellets of a desired size. When the gallium proportion is maintained within the preferred range, the material may be worked conventionally without special tools or techniques.

The alloys of the invention may be prepared by any convenient known method. Preferably care is taken to insure purity and uniformity of the alloy.

One recommended method of making the alloys comprises heating the ingredients in a vacuum furnace to about 500°–600° C. A "forming gas" atmosphere (90% nitrogen—10% hydrogen, by volume) is then introduced into the furnace and the melt is allowed to cool to about 400° C. whereupon it is removed from the furnace into the air and stirred briefly with a quartz rod. Any oxide film, or crust on the surface of the melt is removed at this time and the melt is returned to the furnace. It is once more heated in vacuum to 500°–600° C. Forming gas is introduced into the furnace after the alloy reaches this temperature. The alloy is then cooled as rapidly as possible, maintaining it in the forming gas atmosphere at least until it solidifies.

The melt is cooled rapidly after the ingredients are mixed in order to insure uniformity of composition throughout the resulting ingot. If the alloys are cooled slowly the segregation effect may tend to make the resulting ingot non-uniform in composition throughout its mass.

Other metals such as zinc, copper or tin may also be included in the electrode alloys of the invnetion in relatively small proportions.

For example, it is sometimes desired to use a liquid flux to facilitate wetting of the semiconductor wafer by the electrode at relatively low temperatures. Zinc chloride fluxes are the only fluxes presently known that provide satisfactory wetting between indium alloys and germanium at temperatures below about 400° C. Zinc chloride fluxes, however, dissolve indium and as they evaporate they tend to leave small, isolated portions of indium or indium salts upon the semiconductor surface spaced from the electrode. Such separate portions of indium adversely affect the electrical characteristics of devices made with the fluxes.

It has, therefore, been suggested that a small proportion of zinc be included in the indium electrode and a hydrochloric acid or hydrazine flux be used in place of a zinc chloride flux. The hydroachloric acid present in the flux or formed by its heat decomposition reacts with zinc to produce a small quantity of zinc chloride in a restricted area immediately adjacent to the electrode. The quantity of zince chloride in the flux is thus reduced to the quantity necessary for adequate fluxing action and the spreading of indium by the dissolving action of the flux is minimized.

The optimum quantity of zinc in an indium electrode in this process is about 0.2% to 2% by weight. Zinc may be included in these proportions in the electrodes of the invention to provide the same advantages and effects as in previous electrodes.

Zinc, and many other metals such as copper, cadmium and tin do not have any adverse effects upon the physical, mechanical or electrical properties of the electrodes of the invention when included therein in relatively small proportions such as about 2% or less.

Accordingly to presently accepted theory at least a part of the improved results provided by the practice of the invention may be explained upon the basis of the segregation phenomenon. Gallium has a much larger segregation coefficient in germanium and in silicon than does indium.

The segregation coefficient of an impurity substance such as gallium in germanium, for example, may be defined as the ratio of the concentration of the impurity substance on the solid side of the interface of a longitudinally freezing germanium ingot to the concentration on the liquid side of the interface. (Concentration in solid ÷ concentration in liquid.)

It is believed that partly because of the relatively large segregation coefficient of gallium the recrystallized regions of devices made according to the invention include relatively large proportions of gallium and, therefore, have relatively low resistivities. According to this line of reasoning after the germanium is dissolved in the electrode material during the alloy process and the device starts to cool, the segregation effect operates to limit the quantities of the respective electrode impurity ingredients that are included in the germanium as it recrystallizes. Gallium has a segregation coefficient approximately one hundred times as great as the segregation coefficient of indium. Relatively large proportions of gallium may, therefore, be included in the recrystallized region despite the fact that gallium is present in the electrode material in only small proportions.

The recrystallization of dissolved germanium from an indium alloy solvent is, however, a different phenomenon from the one ordinarily associated with segregation effects. In the first place, the segregation coefficient is based upon a process in which a relatively pure basic material is progressively frozen and impurities present in the material in minor proportions are segregated in accordance with the freezing process.

In the recrystallization process, on the other hand, the impurity is present in major proportions as the solvent in which the basic material is dissolved. Moreover, recrystallization normally takes place at a temperature greatly below the melting point of the basic material.

It is believed that the actual critical parameters which bring about the improvements of the invention are the relative solubilities of gallium in solid germanium and of gallium in liquid indium. The segregation effect, too, involves solubility ratios and is the only quantitative measure thereof presently available in respect of the materials of the invention. Segregation data indicate a relatively high solubility of gallium in solid germanium.

In any event, it is believed that the recrystallized regions of devices according to the invention have a substantially lower resistivity than the recrystallized regions of previous devices of this type which have electrodes without gallium.

The difference between the resistivities of a semiconductive material on opposite sides of a rectifying barrier affects the efficiency of the barrier. The effect is particularly noted in respect of the injection efficiency of the barrier, i.e., the flow of electric charge carriers from the low resistivity side of the barrier to the high resistivity side when the barrier is biased in its forward direction. A relatively large difference in resistivities is conducive to a relatively high injection efficiency. The reduction of the resistivity of the recrystallized region of a surface alloyed electrode increases this difference in resistivities and thereby improves the injection efficiency of the electrodes.

The materials of the invention are useful not only to make p-n rectifying junctions in bodies of n-type semiconductive germanium and silicon but also to make so-called p+p barriers in p-type germanium and silicon bodies.

There have thus been described improved semiconductor devices and methods of making them, which devices include electrodes comprising indium and gallium.

What is claimed is:

1. A semiconductor device comprising a body of semiconductive silicon having a rectifying electrode surface alloyed thereto, said electrode comprising principally indium alloyed with .05% to less than 1% gallium by weight.

2. A semiconductor device comprising a body of semiconductive silicon having a rectifying electrode surface alloyed thereto, said electrode comprising principally indium alloyed with 0.1% to 0.5% gallium by weight.

3. A semiconductor device comprising a body of a semi-conductive material selected from the class consisting of germanium and silicon having a rectifying electrode surface alloyed thereto, said electrode comprising by weight principally indium alloyed with .05% to less than 1% gallium and up to 10% of a metal selected from the class consisting of silver and gold.

4. A semiconductor device comprising a body of a semiconductive material selected from the class consisting of germanium and silicon having a rectifying electrode surface alloyed thereto, said electrode comprising by weight principally indium alloyed with 0.1% to 0.5% gallium and up to 10% of a metal selected from the class consisting of silver and gold.

5. A semiconductor device comprising a body of a semiconductive material selected from the class consisting of germanium and silicon having a rectifying electrode surface alloyed thereto, said electrode comprising 97.5% to 97.9% by weight indium, 0.1% to 0.5% gallium and about 2% of a metal selected from the class consisting of silver and gold.

6. A semiconductor device comprising a body of a semiconductive material selected from the class consisting of germanium and silicon having a rectifying electrode surface alloyed thereto, said electrode comprising an alloy consisting essentially of by weight 97.8% indium, 0.2% gallium and 2% of a metal selected from the class consisting of silver and gold.

7. A semiconductor device comprising a wafer of an n-type semiconductive material selected from the class consisting of germanium and silicon, said wafer having a rectifying electrode surface alloyed thereto, said electrode comprising an alloy consisting essentially of by weight .05% to less than 1% gallium, up to 10% of a metal selected from the class consisting of silver and gold, balance indium.

8. A semiconductor device comprising a wafer of an n-type semiconductive material selected from the class consisting of germanium and silicon, said wafer having a pair of coaxially aligned rectifying electrodes surface alloyed upon opposite faces thereof, said electrodes comprising an alloy consisting essentially of by weight 0.1% to 0.5% gallium, up to 10% of a metal selected from the class consisting of silver and gold, balance indium.

9. A semiconductor device comprising a single crystal wafer of an n-type semiconductive material selected from the class consisting of germanium and silicon, and a pair of rectifying electrodes surface alloyed in coaxial alignment upon opposite faces of said wafer, said electrodes comprising an alloy consisting essentially of by weight 97.8% indium, 0.2% gallium and 2% of a metal selected from the group consisting of silver and gold.

References Cited in the file of this patent

UNITED STATES PATENTS

| | | |
|---|---|---|
| 2,569,347 | Shockley | Sept. 25, 1951 |
| 2,644,852 | Dunlap | July 7, 1953 |
| 2,697,269 | Fuller | Dec. 21, 1954 |
| 2,703,855 | Koch et al. | Mar. 8, 1955 |

OTHER REFERENCES

Fuller: Physical Review, vol. 86, pages 136, 137, May 1952.